Figure 1:
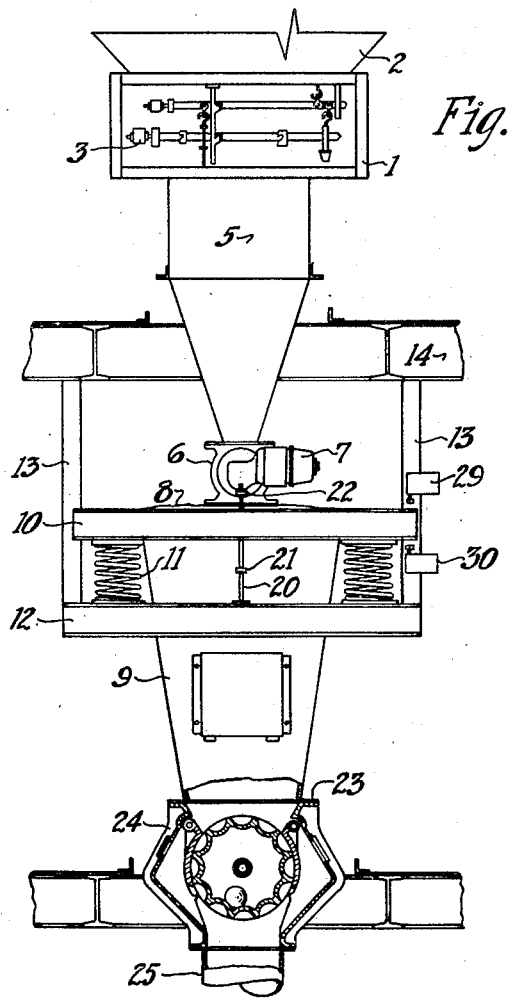

Aug. 11, 1936.   M. E. GRUNEWALD   2,050,314
WEIGHING FEEDER
Filed May 9, 1934   2 Sheets-Sheet 1

INVENTOR
MAX E. GRUNEWALD
BY
ATTORNEY

Aug. 11, 1936.   M. E. GRUNEWALD   2,050,314
WEIGHING FEEDER
Filed May 9, 1934          2 Sheets-Sheet 2

INVENTOR
MAX E. GRUNEWALD.
BY
ATTORNEY

Patented Aug. 11, 1936

2,050,314

UNITED STATES PATENT OFFICE 2,050,314

WEIGHING FEEDER

Max E. Grunewald, Allentown, Pa.

Application May 9, 1934, Serial No. 724,733

13 Claims. (Cl. 249—2)

This invention relates to feeders for dry, pulverulent materials, and more particularly to a feeder for delivering materials in a stream of uniform weight, either continuously or for a predetermined time interval. It is especially concerned with the handling of materials which have a tendency to vary in weight with reference to a unit of volume, due to the presence of entrained air in variable quantities. The invention is adaptable to the handling of materials such as Portland cement, cement raw material, pulverized fuels, lime, soda ash and others having similar physical characteristics.

Although the invention may be used for various purposes, as will be apparent from the following description, it is of especial utility in its application to the feeding of both pulverized coal and dry cement raw materials to kilns, and it will accordingly be specifically described in its application to these purposes.

It is well-known that substantially all dry, pulverulent materials, when stored in bins, vary in weight per cubic foot, the weight increasing due to the pressure head of materials and the length of time that the material has remained in storage, which cause loss of entrained air, and that likewise the weight decreases in various degrees due to bulking. Thus, the materials, as delivered to the bin, may be aerated, and stored materials when withdrawn frequently absorb air as slides of material occur during withdrawal.

It is among the purposes of the present invention to provide a feeding apparatus capable of delivering a continuous stream, which will not vary in its predetermined weight, either due to variable proportions of entrained air, or mechanical defects in the feeding apparatus.

The present apparatus is arranged to deliver continuously a stream of material of a uniform predetermined weight, and may be remotely controlled by the operator to vary the weight of this stream automatically in order to meet changing demands of the process to which it is applied.

In general, the present apparatus comprises a means for withdrawing the material from a storage bin or other source of supply, and delivering weighed quantities or batches to a weigh hopper or scale pan, at predetermined intervals, the material delivered to the scale pan being withdrawn continuously by a feeder, the speed of which is controlled automatically, in accordance with variations in the weight of material per unit of volume, so that the rate of withdrawal is equalized with the weight of each batch and the interval between the discharge of one or a plurality of successive batches into the scale pan.

For withdrawing the material from the source of supply, weighing it and discharging it into the scale pan, I prefer to employ a batch weighing device, in order to obtain greater accuracy and increased range of operation, especially by remote control. The batch weighing apparatus is preferably of the type comprising a feeder for withdrawing material from the bin, and a batch hopper suspended from scale elements, the hopper being provided with an electrically-operated discharge gate. This batching apparatus should be provided with controlling devices to prevent the discharge of batches of either less or more than a predetermined weight, within narrow limits of tolerance, and capable of remote control operation. A batch weighing device, such as that shown in Morrow Patent 1,911,235, is suitable for the purpose in its complete form, without modification either as to structure or controlling circuits, to serve as a unitary element of the present apparatus. It is to be understood, however, that equivalent types of weighing batchers can be substituted without modifying the combination to be described in detail hereinafter.

The quantity of material to be handled is regulated first by adjusting the scale elements of the batcher, to withdraw and weigh a batch of predetermined weight, and second, the rate of batch discharge from the hopper; that is, the number of times the batcher discharges over a predetermined time interval. This rate may be governed electrically by an adjustable contact repeater, or cycle repeat timer, of conventional type such as that disclosed in Johanson Patent 1,978,947.

The batch discharges into a weigh hopper or scale pan, provided with a continuous feeder, preferably one of high volumetric accuracy, and not liable to flooding or flushing. The feeder disclosed in Morrow Patent 1,900,458 has been found satisfactory for the purpose. This feeder is preferably driven at variable speeds, as by means of a direct-current motor, the speed being so controlled by the weight of the material in the scale pan that if the desired weight has not been withdrawn therefrom during an interval between the discharge of succeeding batches, the speed of the feeder is increased by a slight increment for the next interval or intervals. Conversely, if the material discharged into the hopper is in relatively dense form, and the feeder speed has been such that its rate of discharge exceeds that of the batch weighing apparatus, the feeder speed is decreased for the next interval or series of intervals, until the average relative rates have been equalized.

The control of the feeder speed may be accomplished mechanically by controlling the position of the rheostat in the feeder motor circuit, in accordance with extremes of level of the scale pan, but as this arrangement is more sluggish in weighing and more liable to mechanical troubles, I prefer to control the rheostat electrically.

It will be apparent that in the delivery of either pulverized coal or raw materials to a cement kiln, interruption of the stream must be avoided. Accordingly, the scale pan is so adjusted that a reserve quantity of material is always present in excess of that normally to be withdrawn by the feeder. This may conveniently be the equivalent of one batch, and the control of the apparatus is so adjusted that this quantity is considered as a part of the normal minimum weight of the scale pan, and other parts suspended from the scale elements. Likewise, if the contact repeater and its associated parts should fail to dump a batch, due to accidental causes, the scale pan will rise as the residual quantity of material is partially withdrawn, and circuits are closed which cause the batch discharge gate to open.

Although the coal and raw material feeders are a considerable distance apart, and remote from the burning platform of each kiln, it will be understood that the contact repeaters, which may be located near the burner for the convenience of the kiln operator, permit him to vary the rate of feeding either material within all normal ranges, without adjusting the batcher scale elements.

Figure 2:
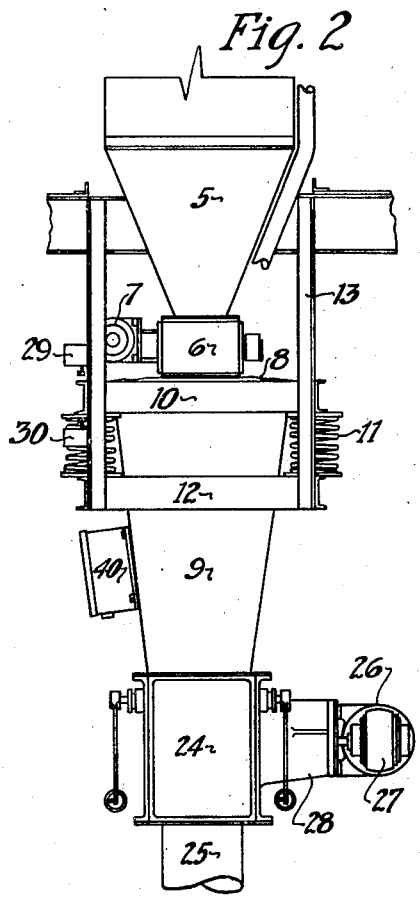
Figure 4:
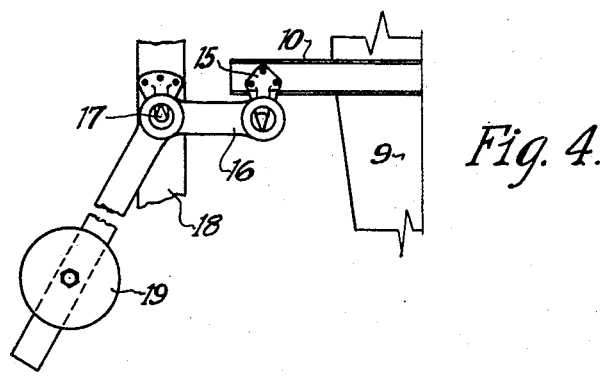
Figure 3:
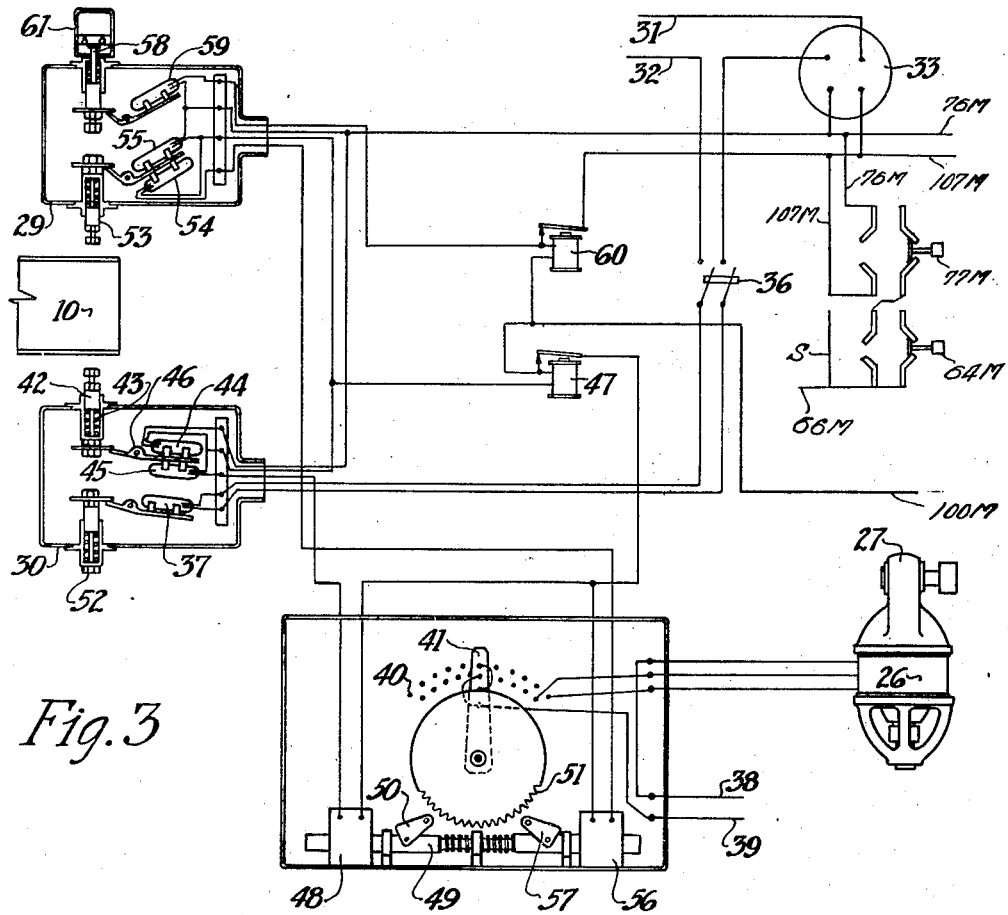
Figure 5:
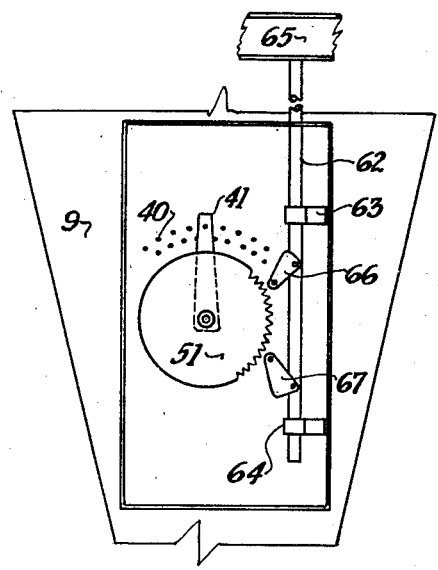

For a better understanding of the invention, reference is made to the accompanying drawings, in which Fig. 1 is a front elevation of the feeder, Fig. 2 is a side elevation, Fig. 3 is a schematic diagram of the preferred control circuit, Fig. 4 is a detail of a modified form of scale element, and Fig. 5 is a detail of a modified form of mechanically actuated rheostat for the feeder motor circuit.

Referring to the drawings, and first to Fig. 1, the apparatus will be seen to consist of a batch weighing device 1 of the type disclosed in the first Morrow patent above referred to, and which is secured in the usual manner to the hopper of the supply bin 2. The batcher comprises the usual scale elements 3, the batch hopper 5, which is discharged by a gate 6, driven by a motor 7. The gate 6 discharges through an aperture in a flexible apron 8, of canvas or other suitable material, which closes the top of the weigh hopper or scale pan 9. The scale pan is suspended from a beam 10, which may conveniently be a rectangular frame, formed by channel members. This beam is yieldingly supported at its four corners by compression springs 11, secured to a frame 12, carried by hangers 13, which suspend the apparatus from a suitable supporting structure 14. It is to be understood that the frame 10 is preferably supported as shown, rather than suspended from springs, to prevent dropping the scale pan and its associated parts, in the event of spring breakage.

By reference to Fig. 4, it will likewise be seen that the beam 10 may be carried by scale elements of the conventional springless type, preferably four, each comprising a knife edge 15, supported by one arm of a bell-crank 16, which is pivotally mounted on a knife edge 17, secured to a fixed support 18, the other arm of the bell-crank being provided with the usual adjustable counterweight 19.

Extreme movement upwardly or downwardly beyond the normal operating limits of the scale pan is prevented by the guide 20, secured to the frame 12, the guide passing through openings in the beam 10 and being provided with stops 21 and 22.

The bottom of the scale pan is provided with a flange 23, to which is secured a feeder 24, of the type disclosed in the second Morrow patent referred to above. The feeder discharges through a flexible spout 25, of canvas or other suitable material, which will permit the desired vertical motion without disturbing the accuracy of weighing. The feeder is preferably driven by a direct-current motor 26, provided with a built-in speed reducer 27, the motor being secured to the feeder body by means of a bracket 28, whereby the feeder and speed reducer shaft may be coupled in the usual manner. The apparatus and the control circuits therefor, which govern the weight of the stream and control it within the limits desired are as follows:

The switches which may change the speed of the feeder driving motor 26 are enclosed in boxes 29 and 30, which may conveniently be secured to one of the hangers 13. Abnormal movement of the beam 10 actuates switches in the upper box 29, if the speed of the feeder is too rapid, due to the handling of material denser than normal, and conversely a decrease in the rate of discharge of the feeder 24, due to the presence of aerated material in the weigh hopper 9 causes the switches in the box 30 to be actuated in a manner to be described hereinafter.

The batch weighing device 1 is of conventional type and is employed as a unitary element of the combination, without modification, either as to its mechanical elements or controlling circuits. Ordinarily, these batchers are provided with a starting circuit, controlled by a push-button switch, to start the operation of withdrawing a batch. A second circuit, likewise controlled by a push-button switch, enables the operator to discharge the batch, but only when it is of correct weight, within predetermined limits of tolerance of over or under weight. These circuits are so related that the discharge gate cannot be opened until the batcher scale is in balance, and cannot be closed until the scale pan 5 is empty, and as soon as the gate is closed the operation of withdrawing a batch from the supply bin 2 can be repeated.

To employ such an apparatus in the present combination, it is only necessary to keep the starting circuit permanently closed and to substitute the time clock or contact repeater for the manually operated or push-button switch in the discharge gate controlling circuit, so that the batches will be discharged into the scale pan 9 at regular time intervals of predetermined length.

Accordingly, if the batch weighing device is that disclosed in Morrow Patent No. 1,911,235, or one similarly controlled, it will be understood that the contacts of the starting push-button switch are permanently closed by a shunt, so that the operation of withdrawing a batch will follow automatically and immediately as soon as the discharge gate 6 has closed, and that the discharging circuit will be closed by the contact repeater instead of the usual push-button.

The power and control circuits for the present apparatus are shown in detail in Fig. 3, together with the connections to the starting and discharging circuits of the Morrow apparatus, all wires or circuits common to both being designated by reference characters terminating in the letter "M".

Power to actuate the control devices, which may be 110 volt, 60 cycle alternating current, for convenience, is supplied through the feeder lines 31 and 32 to the contact repeater, sometimes called a "cycle repeat timer" 33, of any suitable type, such as that shown in the Johanson patent referred to above, and capable of closing another circuit at predetermined, regular intervals, and adjustable to increase or decrease these intervals by very small increments or decrements, to control the rate of discharging the batcher into the scale pan 9, whereby the ultimate rate of feeding may be varied, as will be described in detail hereinafter.

The contact repeater 33 closes a circuit indicated by the lines 107M and 76M, this circuit being usually closed by the discharge gate push-button switch 77M.

The starting circuit contacts of the push-button switch 66M, which normally start the operation of withdrawing material from the supply bin 2, are closed by a shunt S, so that the operation of withdrawing a batch will repeat automatically each time the discharge gate 6 returns to its closed position. It will be seen, from the above, that the contact repeater serves as an automatic substitute for the usual manually operated push-button 77M, and that if another type of batcher is employed that the contact repeater will be connected in an equivalent way to close the batcher discharge circuit at similar intervals.

Power to actuate the devices controlling the rate of operation of motor 26, which drives the feeder 24, is supplied through feeder lines 76M and 100M.

The circuit through the feeder 32 to the contact repeater 33 is provided with a double-pole switch 36, for stopping or starting the apparatus, and in addition, the mercury switch 37, which remains closed during normal operation, but opens and thereby stops the discharge of the batcher if an abnormal quantity of material accumulates in the scale pan, as will be described more in detail hereinafter. The feeder motor 26 may be of the direct-current, shunt-wound type indicated, and supplied through the feeder lines 38 and 39 through a rheostat 40. This rheostat is preferably a type having a multiplicity of contacts, so that movement of the contactor 41 will result in relatively slight increases or decreases in the motor speed.

As described above, a quantity of material is intended to be retained in the scale pan 9 at all times, to prevent interruption of the stream if the speed of the feeder and its driving motor 26 is too great. Assuming that the batcher has discharged a weighed quantity of material into the scale pan 9, the beam 10 will descend to its lowermost normal position. At this position, the plunger 42, which extends through the upper wall of the switch box 30 is adjusted so that it preferably merely makes contact with the lower surface of the beam 10, but is not moved thereby, the plunger being held in the upper position by a spring 43. This adjustment establishes the full normal weight of the scale pan, its associated parts, the reserve quantity of material and one batch.

If, in continuous operation, and during the interval between the discharge of one batch and the next batch into the scale pan, the feeder is operated too slowly to withdraw the entire batch, the next batch delivered will cause the beam to descend below the normal position, and force the plunger 42 downwardly and cause the mercury type switches 44 and 45 to be tilted on the pivoted support 46, thereby closing a circuit through switches 44 and 54, which operates relay 47 and energizes solenoid 56 to force the armature 49 to the left, switch 45 being opened to open the circuit through solenoid 48. The purpose of the relay is to keep the circuit closed long enough to complete the movement of the armature. The armature 49 is carried in suitable guides, and is provided with a pawl 57, which engages a pinion 51, to which the rheostat contactor 41 is secured. Movement of the armature to the left accordingly causes the contactor to be moved to the right to increase the speed of motor 26, so that the next batch discharged, together with at least a part of the residue of the preceding batch will be withdrawn during the next succeeding interval or intervals of operation.

If the increase in speed is insufficient to equalize the rate of batch discharge with that of the rate of withdrawal by the feeder, each succeeding batch will cause further movement of the armature and consequent increases in the feeder motor speed, until the relative operation is completely equalized.

If the rate of batch discharge, as governed by the contact repeater 33, is increased beyond the capacity of the feeder 24 to withdraw material from the scale pan 9, or if due to accidental causes the latter is otherwise overloaded, further movement of the plunger 42 will cause it to make contact with the plunger 52, whereby the latter will tilt the mercury switch 37, thereby opening the circuit to the contact repeater, and stopping the operation of the weighing batcher until the overload has been corrected.

Likewise, in the initial adjustment of the apparatus, after the reserve quantity of material has been deposited in the scale pan 9, the beam 10 is at its upper normal position. The plunger 53, which extends through the lower wall of the switch box 29, is adjusted preferably so that it makes contact with but is not moved by the beam. If, during subsequent batches, the rate of withdrawal by the feeder 24 has been too great, the beam 10 will move the plunger 53, and cause the switches 54 and 55 to be tilted, thereby energizing the decreasing solenoid 48, whereby the pawl 50 will move the pinion 51 and consequently decrease the setting of the rheostat, and the motor 26 will be decreased in speed in successive steps until the rate of withdrawal is equalized with the rate of batching.

Should the contact repeater 33 fail to operate, an emergency device is provided to prevent complete stoppage of the stream discharged by the feeder 24. This is essential only when such interruption will be detrimental to the process to which the apparatus is applied. If the contact repeater fails to close the circuit through the lines 76M and 107M, the feeder 24 will withdraw more of the reserve quantity of material from the scale pan 9, and owing to the decreasing load therein it will rise higher and the beam 10 will force the plunger 53 to move plunger 58, thereby causing the latter to close the circuit represented by the lines 76M and 107M through the mercury switch 59 and relay 60. This causes the batcher discharge gate 6 to open, the oil dash-pot 61, in which the plunger 58 is mounted, maintaining the switch 59 in closed position until the gate 6 has reached its full open position. By further reference to the Morrow patent, it will be seen that the gate 6 remains open until the batch hopper is completely emptied.

The rheostat 40 has been shown in Fig. 1 as attached to a wall of the scale pan 9, but it will be realized that it may be located on any suitable fixed support, if desired. By reference to Fig. 5, it will be seen that the rheostat may be actuated mechanically. In this case it is preferably secured to the scale pan 9, whereby abnormal movement of the latter serves to vary the setting of the rheostat. A rod 62 is substituted for the armature 49, and is movable in guides 63 and 64. One end of the rod is secured to a stationary member, as indicated generally at 65. Abnormal upward movement of the scale pan, due to too rapid discharge of the latter causes the pawl 66 to engage the pinion 51 and to move the contactor 41 over one or more points to decrease the feeder speed by slight increments.

Likewise, abnormal downward movement, due to the failure of the feeder 24 to withdraw the entire batch causes the pawl 67 to move the contactor to increase the feeder speed. It will be realized that alternatively the rheostat 40 may be secured to a fixed support and the rod 62, secured to the scale pan or other part suspended from the scale elements, to obtain similar results.

The operation of the complete apparatus will be generally apparent from the foregoing description of the control circuits. The operator may first set the position of the contactor 41 of the rheostat 40 so that the speed of the feeder with reference to its volumetric capacity will be as nearly correct as can be estimated from the average weight of the material handled per unit of volume, and during an interval represented by the time between the discharge of succeeding batches from the batching apparatus 1. In order ultimately to discharge a stream of desired weight, the scale elements 3 of the batcher 1 are so set that the weight of each batch when continuously and completely withdrawn during each interval or period between batch discharges will result in a stream of the desired weight. The weight of the batch may conveniently be any suitable average amount in order to permit a wide range in rate of discharge from the scale pan 9, by varying the interval or period between batches, by adjusting the contact repeater to operate the batcher discharge gate 6 at the desired intervals. It is especially to be noted that the feeder speed, and consequently the weight of the stream discharged, automatically varies with changes in the rate of batching, as controlled by the adjustment of the contact repeater 33. That is, the control devices above described, being responsive to the weight of material in the scale pan, automatically vary the speed of the feeder as the rate of batching is varied.

The contact repeater 33 may be located at a point remote from the batcher for the convenience of the operator of a process, whereby he can by adjusting the interval between contacts vary the weight of the stream at will within all normal ranges without adjusting the elements of the scale 3, or otherwise modifying the operation of the apparatus.

It will be realized that the total weight discharged by the feeder 24 over any period can be determined by multiplying the batch weight by the number of batches indicated by the "mechanical counting device 84" of the Morrow patent.

Accordingly, the preferred type of contact repeater is one having a minimum interval at least equal to the maximum rate of the batch weighing apparatus, and capable of adjustment in very small steps to intervals of a minute and a half or more. Thus, the weight of the stream can be varied automatically within wide limits, solely by changing the setting of the contact repeater. It will be evident that increasing or decreasing the rate of batching will increase or decrease the rate of discharge of the feeder 24. As has been explained, the normal upward movement of the beam 10, the apparatus suspended therefrom and the reserve quantity of material retained in the pan, is established by adjustment of the plunger 53, whereby the latter merely makes contact, but is not moved. Likewise, the full normal load capacity after the first batch has been dumped will cause the beam 10 to make contact with the plunger 42, without moving the latter. Thus, when the density of the material handled remains constant under normal operating conditions, the beam 10 will merely travel between the plungers without moving them. If, however, the weight of the material per unit of volume varies, the movement of either plunger will vary the feeder speed to compensate for this condition. Likewise, any abnormal flow through the feeder 24 will result in a decrease in the rate of discharge for the next succeeding interval or intervals.

Once the apparatus has been set to operate as above described, and when the power circuits to the batcher and the feeder motor 26 have been closed, closing of the switch 36 will cause the apparatus to operate automatically.

Although the rheostat 40 may be arranged to compensate for under or over loads in the scale pan almost completely during the next successive interval of batching, in order to avoid abrupt variation in the rate of feeding, I prefer to arrange the rheostat and its associated parts to increase or decrease the feeder speed by relatively slight increments or decrements, whereby the abnormal condition will be corrected over a period of several batching intervals.

It will be realized that by discharging definite, weighed quantities of material into the scale pan 9, the head of material above the feeder 24 varies between narrow limits, as contrasted with the variation in head in the supply bin 2, above the batcher. At the same time, the density of the material is more nearly uniform after it is discharged into the scale pan, than when withdrawn from the supply bin. Accordingly, if the stream is withdrawn from the scale pan by a feeder of reasonable volumetric accuracy, the speed of the latter will be fairly constant, and I have found in practice that the apparatus eliminates flooding or flushing, and movement of the rheostat 40 is confined within narrow limits.

It will be realized that many changes in the control elements of the apparatus can be made without departing from the purpose of making variations in the feeder speed responsive to the actual weight of material previously withdrawn by it, whereby the stream discharged continuously is equalized with the weight of each batch and the interval between the discharge of succeeding batches into the scale pan 9.

Although the feeder shown for withdrawing material from the scale pan has been found to be

I claim:

1. A feeder for discharging dry, pulverulent materials in a stream of predetermined weight, which comprises the combination of a scale pan, means for weighing and delivering materials to the scale pan, a feeder for continuously withdrawing materials therefrom, means for driving the feeder and means responsive to abnormal movement of the scale pan to vary the speed of the driving means.

2. A feeder for discharging dry, pulverulent materials in a stream of predetermined weight, which comprises the combination of a scale pan, means for weighing and delivering materials to the scale pan, a feeder for continuously withdrawing materials therefrom, means for driving the feeder and means responsive to abnormal upward movement of the scale pan to decrease the speed of the feeder and means responsive to abnormal downward movement of the scale pan to increase the speed of the driving means.

3. A feeder for discharging dry, pulverulent materials in a stream of predetermined weight which comprises the combination of a scale pan, means for delivering batches of predetermined weight at predetermined intervals to the scale pan, a feeder for withdrawing the materials therefrom continuously, means for driving the feeder, means for decreasing the speed of the driving means when the withdrawal is too rapid and means for increasing the speed of the driving means when the withdrawal is too slow, to equalize the weight of withdrawal with the weight of each batch and the interval between the discharge of successive batches into the scale pan.

4. A feeder for discharging dry, pulverulent materials in a stream of predetermined weight which comprises the combination of a scale pan, means for delivering batches of predetermined weight at predetermined intervals to the scale pan, a feeder for withdrawing the materials therefrom continuously, a variable speed motor for driving the feeder, means for increasing the speed of the motor responsive to an excess in weight of material in the scale pan, means for decreasing the speed responsive to a deficiency in weight of material in the scale pan, to equalize the rate of withdrawal with the weight of each batch and the interval between the discharge of successive batches into the scale pan.

5. A feeder for discharging dry, pulverulent materials in a stream of predetermined weight, which comprises the combination of a scale pan, batch weighing apparatus for withdrawing and discharging batches of predetermined weight at predetermined intervals, into the scale pan, a feeder for continuously withdrawing materials therefrom, a variable speed motor for driving the feeder, control means therefor responsive to abnormal variations in the weight of material in the scale pan to control the speed of the feeder to equalize the weight discharged by it with the weight of each batch and the length of the interval between the discharge of successive batches.

6. A feeder for discharging dry, pulverulent materials in a stream of predetermined weight, which comprises the combination of a scale pan, batch weighing apparatus, for withdrawing and discharging batches of predetermined weight into the scale pan, means for discharging batches at variable predetermined intervals into the scale pan to vary the weight of the stream ultimately discharged, a feeder for continuously withdrawing materials from the scale pan, a variable speed motor for driving the feeder, control means therefor, responsive to abnormal variations in the weight of the material in the scale pan to control the speed of the feeder to equalize the weight discharged by it with the weight of each batch and the length of the interval between the discharge of successive batches.

7. A feeder for discharging dry, pulverulent materials in a stream of predetermined weight, which comprises the combination of a scale pan, batch weighing apparatus for withdrawing and discharging batches of predetermined weight into the scale pan, means for remotely controlling the rate of discharging the batch weighing apparatus to vary the weight of the stream, comprising a feeder for continuously withdrawing materials from the scale pan, a variable speed motor for driving the feeder, control means therefor responsive to weight to increase the speed of the feeder when the speed is too slow to withdraw a batch completely during an interval between successive batches, and additional control means responsive to weight to decrease the speed of the feeder when the latter withdraws a batch in less than said interval to equalize the weight discharged by the feeder with the weight of each batch and the length of the interval between the discharge of successive batches.

8. A feeder for discharging dry, pulverulent materials in a stream of predetermined weight which comprises the combination of a scale pan, batch weighing apparatus for withdrawing and discharging batches of predetermined weight at predetermined intervals into the scale pan, a feeder for continuously withdrawing materials therefrom, a variable speed motor for driving the feeder, a rheostat in the motor circuit, means responsive to the weight of an abnormal quantity of material in the scale pan to control the rheostat and vary the motor speed by small increments to equalize the weight of material discharged by the feeder over a plurality of successive intervals.

9. A feeder for discharging dry, pulverulent materials in a stream of predetermined weight, which comprises the combination of a scale pan, batch weighing apparatus for withdrawing and discharging batches of predetermined weight at predetermined intervals into the scale pan, a feeder for continuously withdrawing materials therefrom, a variable speed motor for driving the feeder, control means therefor responsive to abnormal variations in the weight of material in the scale pan to control the speed of the feeder to equalize the weight discharged by it with the weight of each batch and the length of the interval between the discharge of successive batches, and means for stopping the discharge of the batch weighing apparatus when the scale pan is overloaded.

10. A feeder for discharging dry, pulverulent materials in a stream of predetermined weight, which comprises the combination of a scale pan, batch weighing apparatus for withdrawing and discharging batches of predetermined weight into the scale pan, a feeder for continuously withdrawing materials therefrom, means for driving the feeder at variable speed, control means responsive to abnormal upward movement of the scale pan, for decreasing the speed of said driving means, means for discharging the batch weighing apparatus at predetermined time intervals, and means responsive to further upward movement of the scale pan for discharging the batcher independently of the first-mentioned discharge means to prevent interruption of the stream discharged by the feeder.

11. A feeder for discharging dry, pulverulent materials in a continuous stream of predetermined weight, which comprises the combination of a scale pan, batch weighing apparatus for withdrawing and discharging batches of predetermined weight at predetermined intervals into the scale pan, a feeder for continuously withdrawing materials therefrom, and means to cause the feeder normally to withdraw a batch within the interval between the discharge of successive batches, comprising a variable speed motor for driving the feeder, control means to decrease the speed of the motor, actuated by movement of the scale pan above a normal upper limit, control means to increase the speed actuated by movement below a normal lower limit, both said control means being inoperative to vary the motor speed when the scale pan moves within said limits.

12. A feeder for discharging dry, pulverulent materials in a continuous stream of predetermined weight, which comprises the combination of a scale pan, batch weighing apparatus for withdrawing and discharging batches of predetermined weight, at predetermined intervals into the scale pan, a feeder for continuously withdrawing materials therefrom, and means to cause the feeder normally to withdraw a batch within the interval between the discharge of successive batches, comprising a variable speed motor for driving the feeder, a rheostat in the circuit of the motor, control means actuated by movement of the scale pan above a normal upper limit to adjust the rheostat to decrease the feeder speed by a small decrement, similar control means actuated by movement of the scale pan below a normal lower limit to increase the feeder speed by a small increment, said adjustment of the rheostat being maintained until further abnormal movement of the scale pan makes further adjustment, both of said control means being inoperative to change the position of the rheostat when the scale pan moves between said limits.

13. A feeder for discharging dry, pulverulent materials of variable weight per unit of volume in a continuous stream of predetermined, uniform weight, which comprises the combination of a batch weighing apparatus for withdrawing batches of predetermined weight, means for discharging the batches at predetermined intervals, a scale pan for receiving the discharged batches, having capacity to contain a reserve quantity of material and one batch, a feeder for continuously withdrawing material from the scale pan, and means to cause the feeder normally to withdraw a batch within the interval between the discharge of successive batches, comprising a variable speed motor for driving the feeder, means responsive to a decrease in weight of material in the scale pan when the feeder has withdrawn part of said reserve quantity, to decrease the speed of the motor by a small decrement, means responsive to a weight of material in excess of said reserve quantity and batch to increase the speed of the motor by a small increment, to cause the weight of the stream to be equalized with the weight of the batch over a plurality of successive intervals.

MAX E. GRUNEWALD.